(12) United States Patent
Zemla et al.

(10) Patent No.: US 9,915,513 B1
(45) Date of Patent: Mar. 13, 2018

(54) ELECTRONIC IGNITION CIRCUIT AND METHOD FOR USE

(71) Applicant: DynaEnergetics GmbH & CO. KG, Troisdorf (DE)

(72) Inventors: Andreas Robert Zemla, Much (DE); Sascha Thieltges, Siegburg (DE); Frank Graziola, Königswinter (DE)

(73) Assignee: DynaEnergetics GmbH & Co. KG, Troisdorf (DE)

( * ) Notice: Subject to any disclaimer, the term of this patent is extended or adjusted under 35 U.S.C. 154(b) by 0 days.

(21) Appl. No.: 15/499,439

(22) Filed: Apr. 27, 2017

Related U.S. Application Data

(60) Provisional application No. 62/454,841, filed on Feb. 5, 2017.

(51) Int. Cl.
*F42D 1/05* (2006.01)
*F42C 15/40* (2006.01)
*H02H 3/20* (2006.01)

(52) U.S. Cl.
CPC ............. *F42D 1/05* (2013.01); *F42C 15/40* (2013.01); *H02H 3/202* (2013.01)

(58) Field of Classification Search
CPC ............ F42D 1/05; F42C 15/40; H02H 3/202
USPC ........................................................ 361/251
See application file for complete search history.

(56) References Cited

U.S. PATENT DOCUMENTS 4,860,653 A 8/1989 Abouav
4,869,171 A 9/1989 Abouav
6,085,659 A * 7/2000 Beukes ............... F42D 1/05
                                                         102/200

(Continued)

FOREIGN PATENT DOCUMENTS

CN     104345214 A     2/2015
DE     3412798 A1      10/1985

(Continued)

OTHER PUBLICATIONS

Kumar et al., Delay circuit for multiple detonator, IJISET—International Journal of Innovative Science, Engineering & Tech., May 2015, 6 pages, vol. 2 Issue 5, www.ijiset.com.

(Continued)

*Primary Examiner* — Thienvu Tran
*Assistant Examiner* — Kevin J Comber
(74) *Attorney, Agent, or Firm* — Lisa J. Moyles; Janelle A. Bailey

(57) ABSTRACT

The present disclosure describes an electronic ignition circuit ("EIC") for controlling at least one detonator. The EIC may include a protection circuit, an input circuit coupled to the protection circuit, a logical circuit electrically coupled to the input circuit, and an ignition circuit electrically coupled to the logical circuit. The protection circuit may include at least one of a fuse, a circuit breaker and an automatic switch. The logical circuit may include an answer back circuit, and a switching circuit adapted to switch to the next detonator or igniter. The ignition circuit may include a capacitor charging circuit, a capacitor discharge circuit to discharge a firing capacitor through a fuse head, and a shot detection circuit adapted to measure a voltage across the firing capacitor before discharging through the fuse head and to measure a voltage after discharging through the fuse head.

16 Claims, 8 Drawing Sheets

(56) References Cited

U.S. PATENT DOCUMENTS

| | | | |
|---|---|---|---|
| 6,173,651 | B1 | 1/2001 | Pathe et al. |
| 6,222,749 | B1 * | 4/2001 | Peron ................ H02M 1/083 |
| | | | 363/125 |
| 6,274,948 | B1 | 8/2001 | Blank et al. |
| 6,785,116 | B1 | 8/2004 | Hummel et al. |
| 7,301,750 | B2 | 11/2007 | DeVries et al. |
| 7,802,619 | B2 | 9/2010 | Hurst et al. |
| 7,870,825 | B2 | 1/2011 | Teowee |
| 8,582,275 | B2 | 11/2013 | Yan et al. |
| 2005/0011390 | A1 | 1/2005 | Jennings, III |
| 2013/0220613 | A1 * | 8/2013 | Brooks ................ E21B 43/11 |
| | | | 166/297 |
| 2016/0050724 | A1 * | 2/2016 | Moon ................ H05B 33/089 |
| | | | 315/200 R |

FOREIGN PATENT DOCUMENTS

| | | |
|---|---|---|
| DE | 4302009 A1 | 1/1993 |
| DE | 4330195 C1 | 9/1993 |
| DE | 102004044683 A1 | 9/2004 |
| DE | 102005031673 A1 | 3/2006 |
| WO | WO-9846965 A1 | 3/1998 |
| WO | WO-2011027991 A2 | 3/2011 |

OTHER PUBLICATIONS

Kumar et al., Novel Miniature Firing circuit for semiconductor bridge detonator initiation, Armament Res. and Dev. Establishment, Feb. 14, 2015, 4 pages, http://www.academia.edu.

Babu et al., Programmable Electronic Delay Device for Detonator, Defence Science Journal, May 2013, 3 pages, vol. 63, No. 3, https://doaj.org/article/848a537b12ae4a8b835391bec9.

Dynaenergetics, Plug-N-Perf Optimized, Jul. 2016, 6 pages http://www.dynaenergetics.com/uploads/files/56e6f94760245_Product_Brochures_DynaSelect_OnlineView.pdf.

Allied Horizontal, Advancing Plug-and-Perf Safety and Reliability, Jul. 2015, 2 pgs, http://alliedhorizontal.com/wireline-services/perforating-services/.

European Patent Office, Invitation to Pay Additional Fees and Partial Search Report and Written Opinion of International App No. PCT/EP2017/069327, dated Oct. 20, 2017, 14 pages.

International Search Report and Written Opinion of International App No. PCT/EP2017/069327, which is in the same family as U.S. Appl. No. 15/499,439, dated Dec. 11, 2017, 17 pages.

* cited by examiner

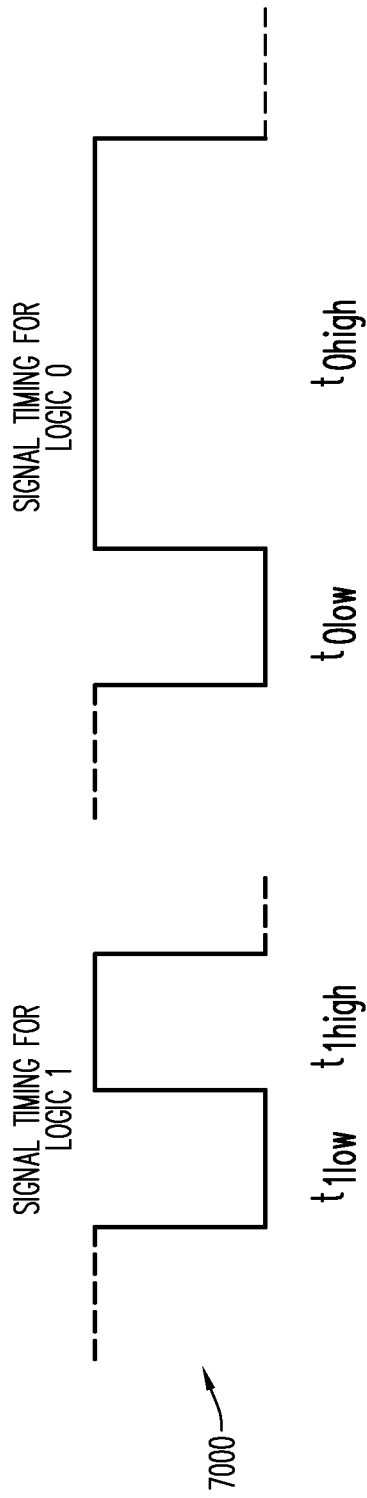

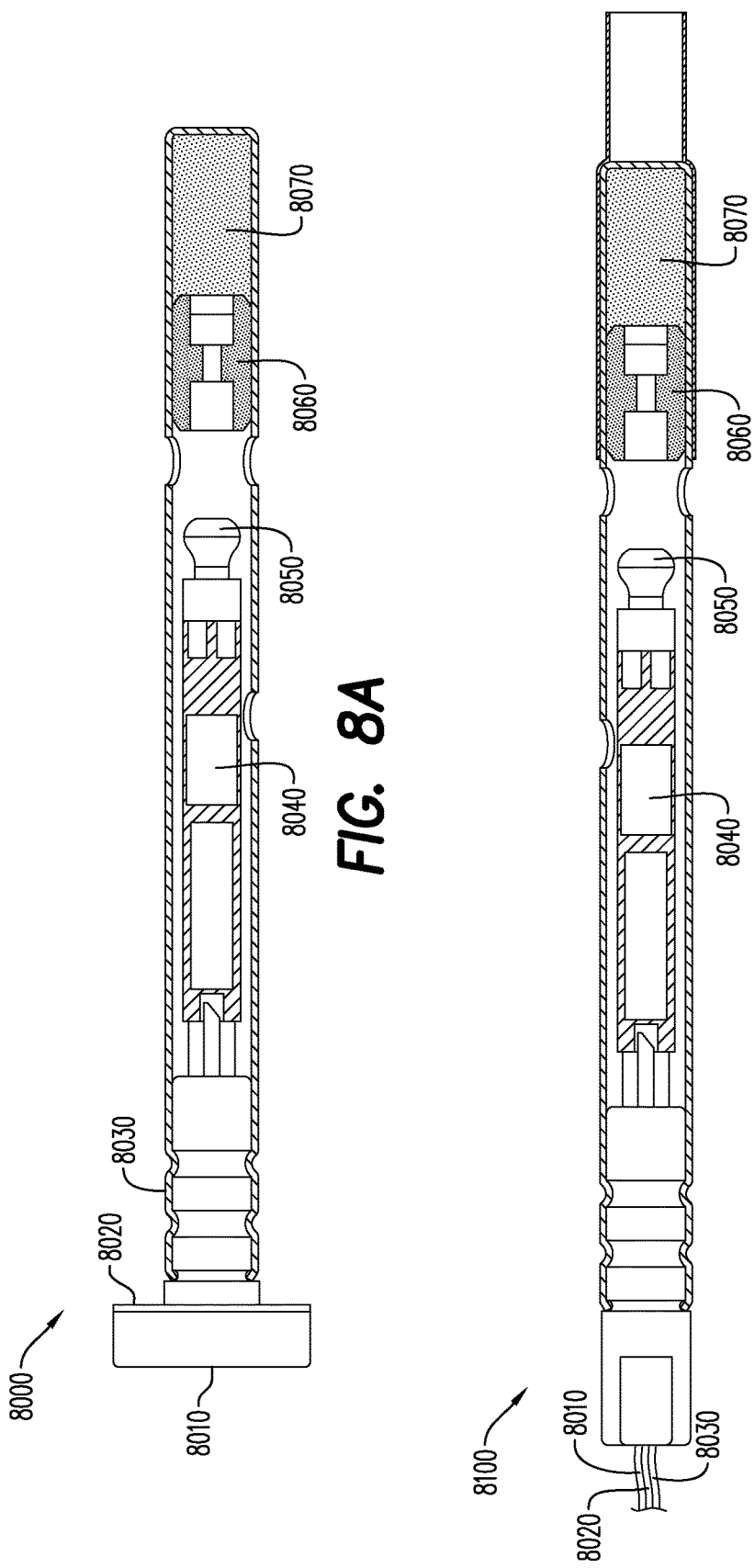

ELECTRONIC IGNITION CIRCUIT AND METHOD FOR USE

CROSS-REFERENCE TO RELATED APPLICATIONS

This application claims the benefit of U.S. Provisional Application No. 62/454,841, filed Feb. 5, 2017, which is incorporated herein by reference in its entirety.

FIELD

The present disclosure relates generally to electronic ignition circuits ("EIC") for controlling and inducing the ignition of explosive substances. More specifically, an EIC controls an igniter/detonator in a well perforation system containing an explosive or pyrotechnic substance used in oil and natural gas wells, are described herein.

BACKGROUND

Many different commercial activities employ one or more explosive, pyrotechnic and gas-producing substances (herein, "explosive substances") to achieve a variety of engineering and ultimately commercial objectives. For example, explosive substances are used in the oil and natural gas industries to enhance production in wells. Once a promising location has been identified, and the necessary rights secured, the creation of such wells typically begin with drilling a borehole into the ground to reach sought-after deposits of oil and/or natural gas. To prevent collapse of the borehole, a casing is often co-axially inserted into the borehole. In most situations, cement is pumped into a more or less annular space between the cylindrical casing and the larger cylindrical borehole wall to mechanically stabilize the well. While this method improves mechanical stabilization of the well, unfortunately, it also isolates inner portions of the casing, (i.e., the wellbore), from the sought-after deposits of oil and/or natural gas.

A perforating gun system employing explosive components is typically lowered into the casing in the borehole via a wireline or tubing conveyed. The wireline is often unrolled from a motorized spool attached to pulleys and a wireline-truck on the surface (surface truck) adapted to this purpose. In other circumstances, derricks, slips and other similar systems take the place of the surface truck. These provide an operator with an ability to raise and lower the perforating gun system inside the well. The wireline cable provides both a physical connection and an electrical connection between the equipment on the surface and the perforating gun system. The purpose of the perforating gun system is to create perforations in the casing, cement, borehole wall and, to some degree, adjacent geologic formations, to enable oil and/or natural gas to flow into the casing. Selective perforating gun systems often include more than one perforating gun, physically and electrically connected with each other in one tool string, which is then connected to the wireline. Generally, the tool string is conveyed a considerable distance from the surface depending on the depth of the well and the position of the intervals that are intended to be perforated.

Each perforating gun typically includes multiple explosive charges, such as shaped charges, that include an explosive substance, and an electrically-initiated igniter or detonator to detonate the explosive substance. An electrical signal from the wireline causes the electrically-initiated igniter or detonator to detonate the explosive substance, forcing a high energy perforating jet out of the perforation gun into a side of the casing at a high velocity, thereby perforating the casing, cement, borehole and adjacent geologic formation. Because the oil and natural gas industries have been drilling boreholes of greater depths and lengths in search of resources, the ability to detonate and perforate selectively has taken on increasing importance. The ability to more precisely apply one or a series of detonations, as well as the ability to cause detonations further away from surface equipment, makes it desirable to have better control over perforation systems inside wells.

BRIEF DESCRIPTION

In some embodiments, the present disclosure describes an electronic ignition circuit ("EIC"). The EIC enables better control over selective perforation systems inside wellbores.

In some embodiments, the present disclosure describes an EIC for controlling at least one detonator. The EIC may include a protection circuit including at least one of a fuse head, a circuit breaker and an automatic switch. According to an aspect, the EIC includes an input circuit that is electrically coupled to the protection circuit. The EIC may include a logical circuit electrically coupled to the input circuit, and an ignition circuit electrically coupled to the logical circuit. According to an aspect, the logical circuit includes an answer back circuit, and a switching circuit adapted to switch to the next detonator/igniter. The ignition circuit may include a capacitor charging circuit, a capacitor discharge circuit to discharge a firing capacitor through the fuse head, and a shot detection circuit adapted to measure a voltage across the firing capacitor before discharging through the fuse head and to measure a voltage after discharging through the fuse head.

In some other embodiments, the present disclosure describes an EIC for controlling at least one detonator. According to an aspect, the EIC includes a protection circuit having a spark gap, at least one of a fuse, a circuit breaker and an automatic switch. The EIC may further include at least one or more of a varistor and/or a suppressor diode at an input, and at least one or more of a varistor and/or a suppressor diode at an output. In an embodiment, the EIC includes an input circuit electrically coupled to the protection circuit and including a bridge rectifier, as well as a logical circuit electrically coupled to the input circuit and including an answer back circuit, and a switching circuit for switching from a first detonator to a next detonator. The EIC may include an ignition circuit including a capacitor charging circuit, and a capacitor discharge circuit to discharge a firing capacitor through a fuse head.

In still other embodiments, the present disclosure describes a method for controlling at least one detonator with an EIC. The method may include polling for a first input signal, and determining if the first input signal contains a first code or a second code. If it is determined that the first input signal contains the first code, the method includes closing a selective switch. If, however, it is determined that the first input signal does not contain the first code, and it is determined that the first input signal contains the second code, the method further includes closing a response switch. The method may further include polling for a second input signal, determining if the second input signal contains a second code, and closing an arming switch and charging a firing capacitor if the second input signal contains the second code. According to an aspect, the method includes polling for a third input signal, determining if the third input signal contains a third code, and closing firing switch if the third input signal contains the third code.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 7A is a timing diagram of an exemplary embodiment of an EIC for controlling at least one detonator, according to the present disclosure;

FIG. 7B is an equation diagram of an exemplary embodiment of an EIC for controlling at least one detonator, as shown in FIG. 7A, according to the present disclosure;

FIG. 8A is a cross-sectional side view of an exemplary embodiment of a detonator having an electronic ignition circuit ("EIC"), according to the present disclosure; and FIG. 8B is a cross-sectional side view of an exemplary embodiment of a detonator having an EIC, according to the present disclosure.

DETAILED DESCRIPTION

Figure 1:
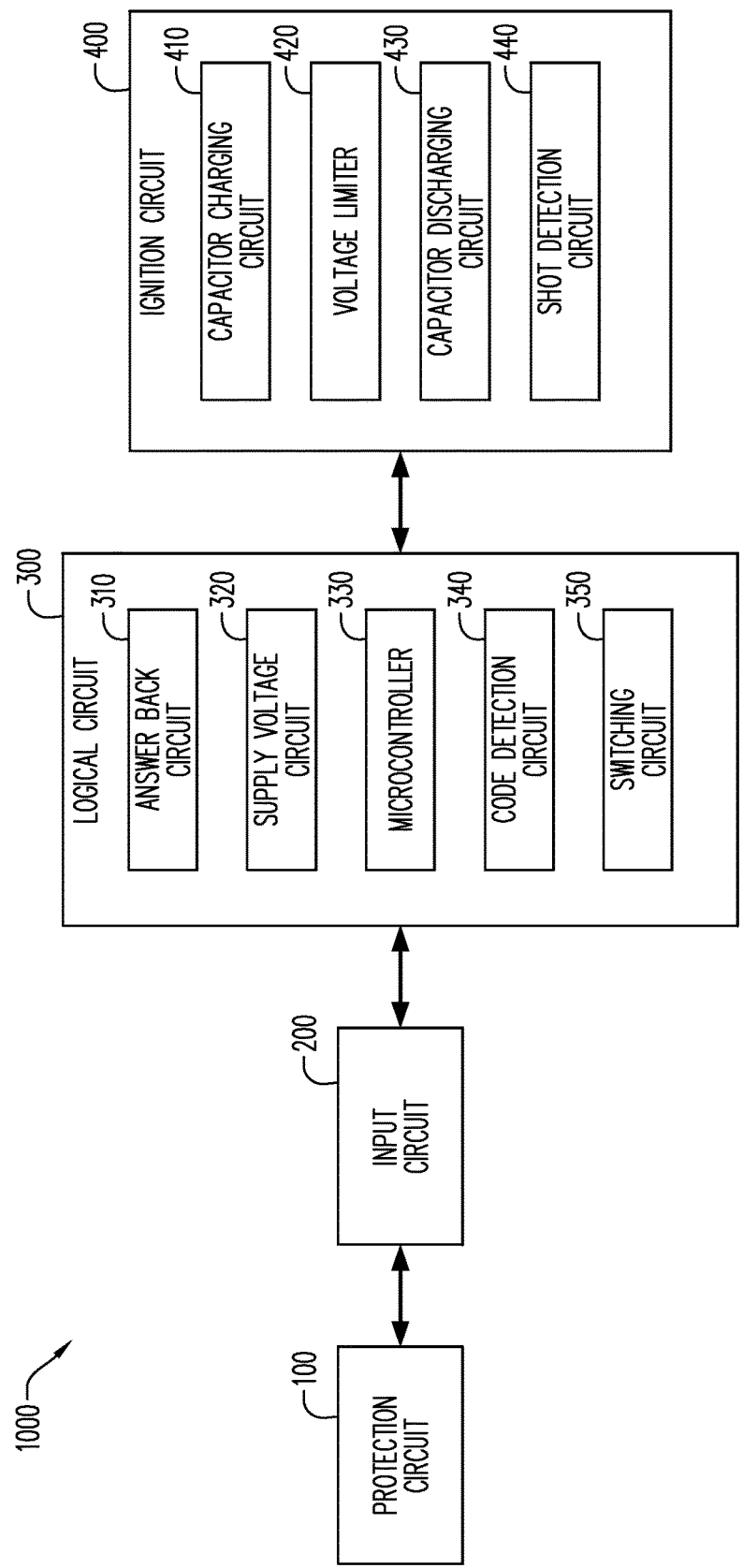
FIG. 1 is a block diagram of an exemplary embodiment of an EIC for controlling at least one detonator, according to the present disclosure.

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to "one embodiment," "an embodiment" or the like means that a particular feature, structure, characteristic, advantage or benefit described in connection with the embodiment may be included in at least one embodiment of the disclosure, but may not be exhibited by other embodiments. The appearances of the phrase "in one embodiment" in various places in the specification are not necessarily all referring to the same embodiment, nor are separate or alternative embodiments mutually exclusive of other embodiments. Similarly, various requirements are described which may be requirements for some embodiments but not for other embodiments. Terms such as "first," "second," "forward," "rearward," etc. are used to identify one element from another, and unless otherwise specified are not meant to refer to a particular order or number of elements. The singular forms "a," "an" and "the" include plural referents unless the context clearly dictates otherwise. The specification and drawings are to be regarded in an illustrative sense rather than a restrictive sense. Various modifications may be made thereto without departing from the spirit and scope as set forth in the claims.

Described herein are example embodiments of an electronic ignition circuit ("EIC") for controlling at least one detonator. The examples discussed herein are intended to be illustrative only to assist in explanation of the apparatuses, devices, systems and methods described. Features or components shown in the drawings or discussed below should not be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not envisioned. Also, for any methods described, regardless of whether the method is described in conjunction with a flow chart, it should be understood that unless otherwise specified or required by context, any explicit or implicit ordering of steps performed in the execution of a method does not imply that those steps must be performed in the order presented but instead may be performed in a different order or in parallel.

Figure 5:
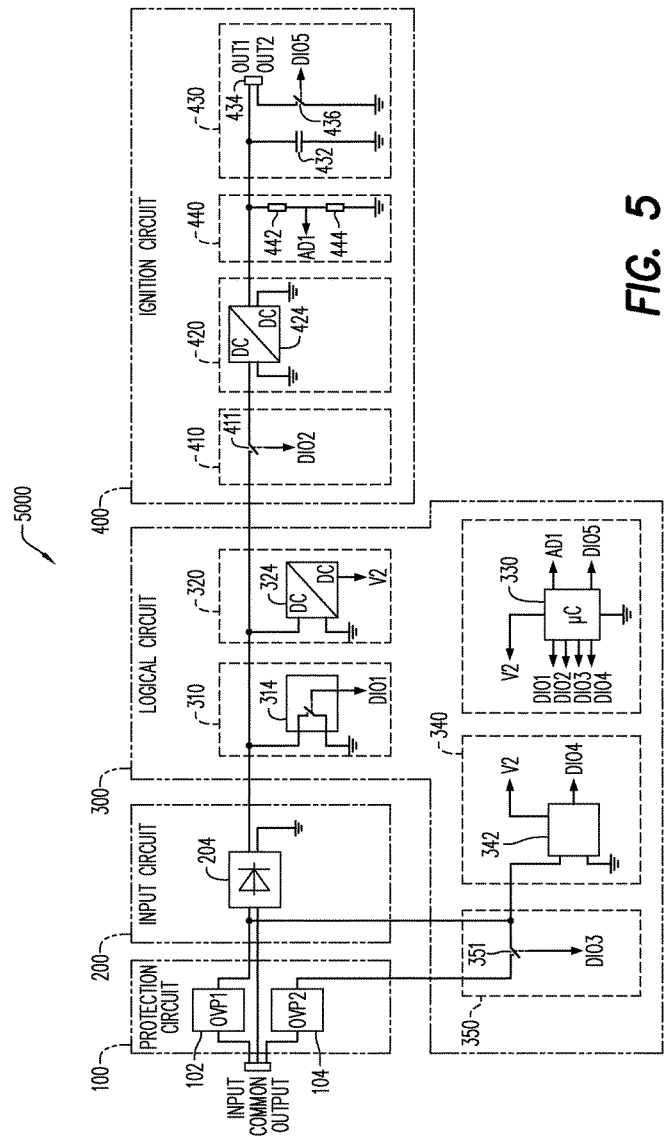
FIG. 5 is a schematic diagram of an EIC for controlling at least one detonator, according to the present disclosure.

Referring to FIG. 1, a block diagram of an exemplary embodiment of an EIC 1000 for controlling at least one detonator 8000 (see, for instance, FIGS. 8a and 8b), according to the present disclosure, is shown. In some embodiments, the EIC 1000 includes a protection circuit 100, an input circuit 200, a logical circuit 300 and an ignition circuit 400. The protection circuit 100 includes an input terminal, an output terminal and a common (com) terminal, as shown in FIG. 5, electrically connected to the input line, the output line and the common line, respectively. Returning to FIG. 1, the protection circuit 100 protects the EIC 1000 from excessive transient voltages beyond a predefined maximum, such as voltage spikes, that could otherwise cause damaging currents in the EIC. In some embodiments, the protection circuit 100 includes at least one or more of varistors and/or suppressor diodes to protect against excessive transient voltages by shunting the current created by excessive voltages away from other circuits in the EIC 1000.

The input circuit 200 is electrically connected to the protection circuit 100. The input circuit receives electrical power from the protection circuit and exchanges communications signals with surface equipment. The input circuit 200 includes a bridge rectifier. Returning to FIG. 1, the input circuit 200 exchanges signals with the logical circuit 300.

The logical circuit 300 is electrically connected between the input circuit 200 and the ignition circuit 400. The logical circuit 300 receives electrical power from the protection circuit and exchanges communications signals with surface equipment through the input circuit 200. In some embodiments, the logical circuit 300 includes an answer back circuit 310, a supply voltage circuit 320, a microcontroller 330, a code detection circuit 340 and a switching circuit 350. In general, the answer back circuit 310 provides a signal output back to the surface equipment to indicate a result of a command or test. For example, in some embodiments, the EIC receives four (4) codes each having a different combination of signals of eight (8) coded bits (one byte). In some embodiments, the four codes are designated as Code A, Code B, Code C and Code D, respectively, and each have a different function in the EIC 1000. In some embodiments, at a valid reception of Code B, the microcontroller 330 switches a resistor in the answer back circuit 310 to increase the current flow for answer back to surface equipment in communication with the EIC 1000. In some embodiments, the supply voltage circuit 320 converts voltages from the protection circuit 100 and input circuit 200 to voltage levels acceptable to the logical circuit 300. In some embodiments, the microcontroller 330 exchanges signals, such as Codes A-D, with surface equipment to control detonation as described herein. In some embodiments, the code detection circuit 340 detects and distinguishes between each of the Codes A-D. The microcontroller 330 may be programmed to detect the codes from the code detection circuit 340. In some embodiments, the switching circuit 350 increases current on the input line to be compatible with previous perforation systems.

The ignition circuit 400 is electrically connected to the logical circuit 300. The ignition circuit 400 is controlled by the logical circuit 300 to store electrical energy and cause ignition of an explosive substance in a perforation gun (not shown). In some embodiments, the ignition circuit 400 includes a capacitor charging circuit 410, a voltage limiter 420, a capacitor discharging circuit 430 and a shot detection circuit 440. In some embodiments, the microcontroller 330 causes the capacitor charging circuit 410 to begin charging a firing capacitor used to caused detonation in response to receipt of Code C, as described herein. In some embodiments, the voltage limiter 420 includes a Zener diode to limit voltage applied to the capacitor charging circuit 410 to protect the capacitor at high temperatures often found underground. In some embodiments, the capacitor discharging circuit 430 controls the ignition of a detonator. In some embodiments, the detonator includes an electrically-initiated fuse head. In some embodiments, the shot detection circuit 440 detects detonation of an explosive substance caused by the electrically-initiated fuse head. The shot detection circuit 440 includes an integrated shot detection feature. A measurement is made of a voltage across the firing capacitor shortly before and shortly after the fuse head is ignited to determine whether a correct discharge took place. According to an aspect, the shot detection circuit 440 is active after discharging the firing capacitor. If the measured voltage is in the expected pre-ignition range shortly before the fuse head is ignited and in the expected post-ignition range shortly after the fuse head is ignited, the shot detection circuit 440 generates a result signal indicating that a proper detonation occurred; otherwise, the shot detection circuit generates a result signal indicating that a proper detonation has not occurred. The result signal (used to define a result variable) from the shot detection circuit 440 is transmitted via the answer back circuit 310 to the surface equipment. Because the shot detection circuit 440 measures voltage across the firing capacitor both shortly before and shortly after the fuse head is ignited, the accuracy of the result signal is improved, thereby enabling better control of the perforation system because ignition is known with greater accuracy and precision. Better control of the perforation system also enables longer wirelines to be advantageously deployed.

Figure 2:
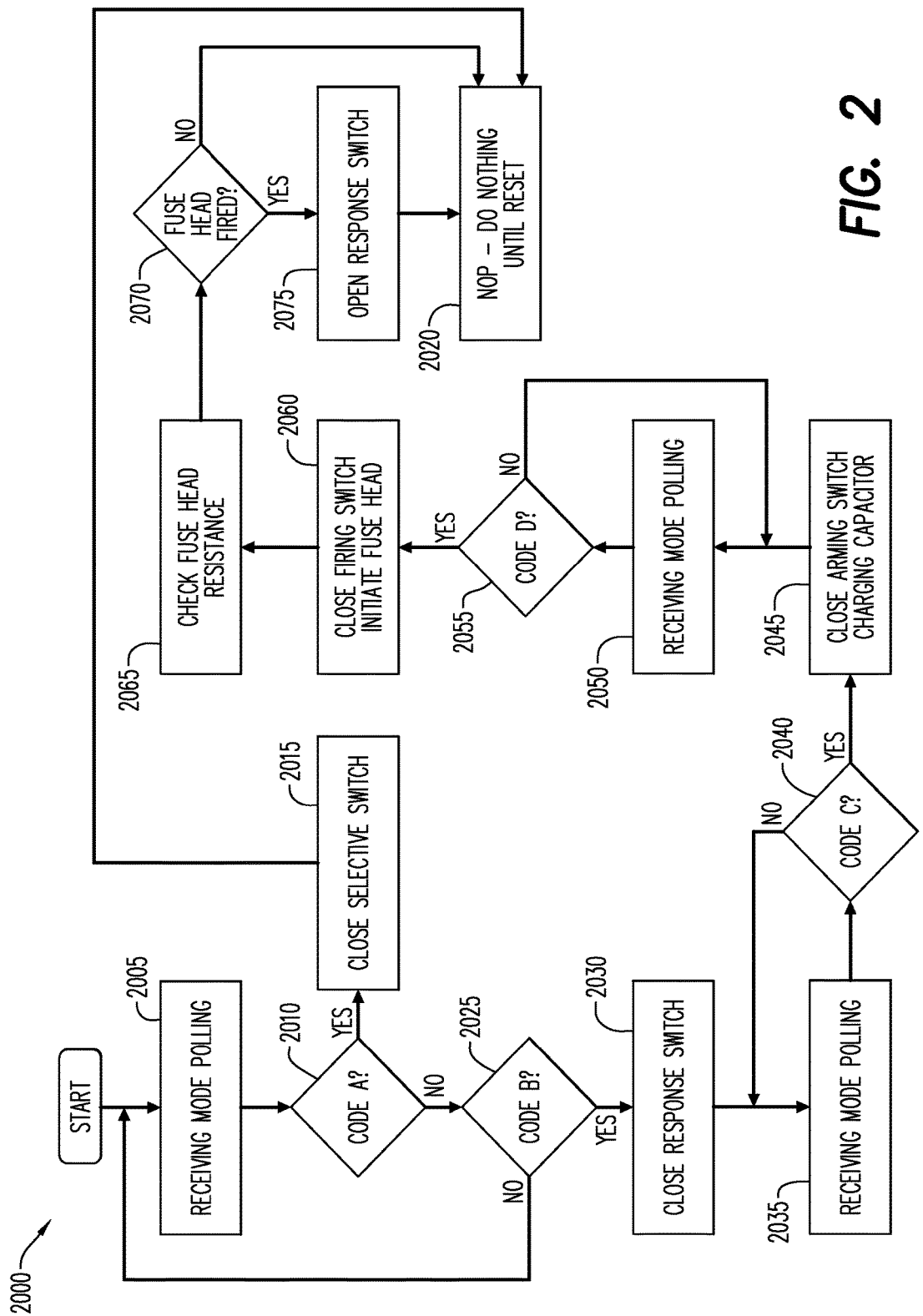
FIG. 2 is a flowchart of an exemplary embodiment of the EIC of FIG. 1 for controlling at least one detonator, according to the present disclosure.

Referring to FIG. 2, a flowchart of the EIC 1000 of FIG. 1 for controlling 2000 at least one detonator, according to the present disclosure, is shown. In step 2005 the microcontroller 330 in the EIC 1000 begins polling for codes received from the surface equipment. In some embodiments, the four (4) codes recognized by the EIC 1000 include: Code A for incrementing control to a next perforating gun; Code B for causing the microcontroller 330 to increase the current flow for answer back to surface equipment in communication with the EIC 1000; Code C for arming the ignition circuit 400 electrically coupled to the current perforating gun; and Code D for firing a current perforating gun with the ignition circuit 400. In some embodiments, Codes A-D are described as particular two-digit hexadecimal bits corresponding to the 8 bits in the code such that none of the hexadecimal bits are repeated in any of Codes A-D.

In step 2010 the EIC 1000 determines if Code A was received. If Code A was received, in step 2015, the EIC 1000 closes a selective switch, then in step 2020 the EIC performs no operation (NOP) and does nothing further until the microcontroller 330 in the EIC is reset. Alternatively, if Code A is not detected, then in step 2025 the EIC 1000 determines if Code B was received. If Code B was not received, the EIC 1000 continues polling in step 2005; if Code B was received, the EIC closes a response switch in step 2030 and begins receiving mode polling in step 2035. In step 2040, the EIC 1000 determines whether Code C is received, indicating that the EIC is being instructed to arm and charge the firing capacitor. If Code C is not received in step 2040, the EIC 1000 continues polling in step 2035; if Code C is received in step 2040, the EIC closes the arming switch charging capacitor in step 2045 and enters receiving mode polling in step 2050.

In step 2055, the EIC 1000 determines whether Code D is received, indicating that the EIC is being instructed to fire and discharge the firing capacitor. If Code D is not received in step 2055, the EIC 1000 continues polling in step 2050; if Code D is received in step 2055, the EIC proceeds to step 2060. According to an aspect, a firing transistor is used to discharge the firing switch through the fuse head. The firing transistor may remain active closed after the discharge of the firing capacitor through the fuse head.

In step 2060, the EIC 1000 applies a voltage across the firing capacitor shortly before the fuse head is ignited, the firing switch is then closed to initiate the fuse head causing ignition of the explosive substance, and shortly after the fuse head is ignited the EIC 1000 again applies a voltage across the firing capacitor to determine whether a correct discharge took place. If the correct discharge took place, the fuse head is destroyed. According to an aspect, at least three measured voltages are used to set a result variable representing one of a successful shot, and a failed shot. In an embodiment, the shot detection circuit 440 in the EIC 1000 measures voltage across the firing capacitor in step 2060 shortly before the fuse head is ignited and in step 2065 shortly after the fuse head is ignited to determine whether a correct discharge took place. In step 2070, if the measured voltage from step 2060 is in the expected pre-ignition range shortly before the fuse head is ignited and the measured voltage from step 2065 is in the expected post-ignition range shortly after the fuse head is ignited, then in step 2075, the response switch is opened and the shot detection circuit 440 generates a result signal indicating that a proper ignition occurred and proceeds to step 2020, otherwise, the shot detection circuit generates a result signal indicating that a proper ignition has not occurred and also proceeds to step 2020.

Figure 3:
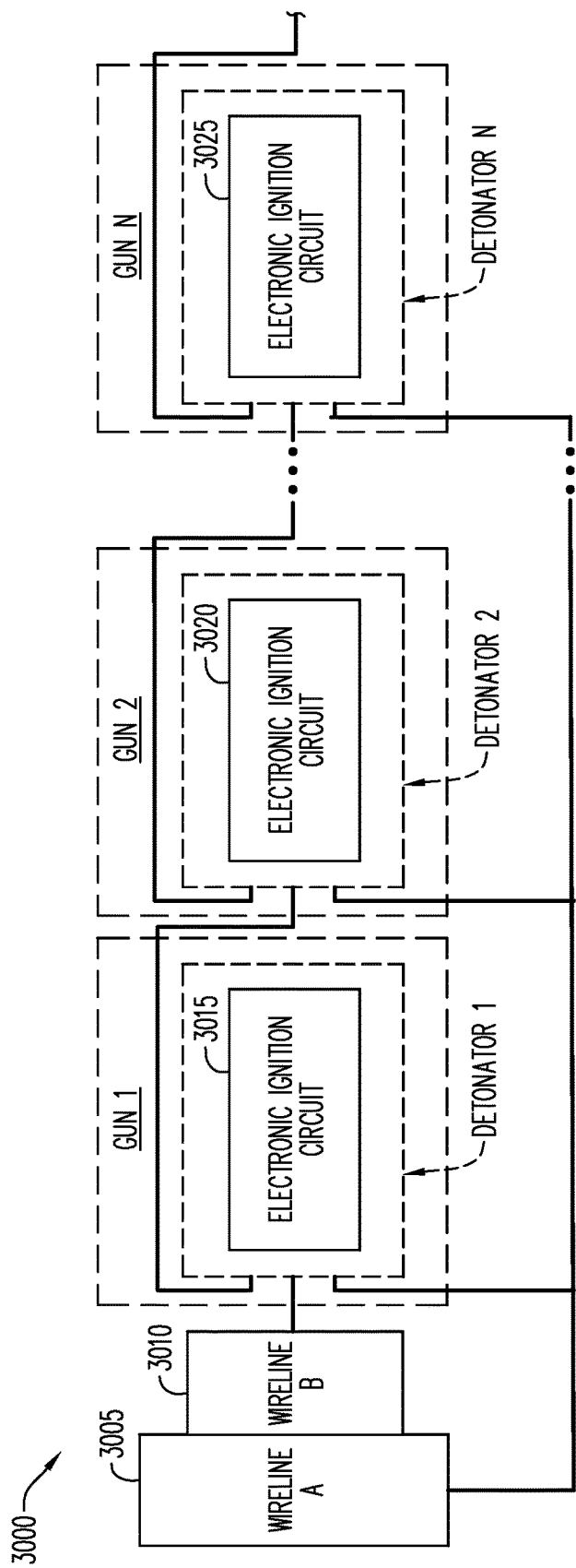
FIG. 3 is a block diagram of an exemplary embodiment having a plurality N of EIC each for controlling at least one detonator, according to the present disclosure.

Referring to FIG. 3, a block diagram of an exemplary embodiment having a plurality N of detonators with EIC each for controlling at least one detonator 3000, according to the present disclosure, is shown. In FIG. 3, each perforation gun is represented by a dashed line box that includes a separate detonator with EIC 1000. More specifically, Gun 1 includes a detonator with EIC 3015, Gun 2 includes a detonator with EIC 3020, Gun N includes a detonator with EIC 3025. Gun 1, Gun 2 and Gun N each represent sequentially connected perforation guns wherein N is a whole number integer. In some embodiments, N is a whole number integer greater than or equal to two. Each perforation gun is connected in parallel to Wireline A 3005. Each perforation gun is connected in series to Wireline B 3010 such that Wireline B is electrically connected to EIC 3015, which is connected to EIC 3020, which is electrically connected to EIC 3025 and so forth.

Figure 4:
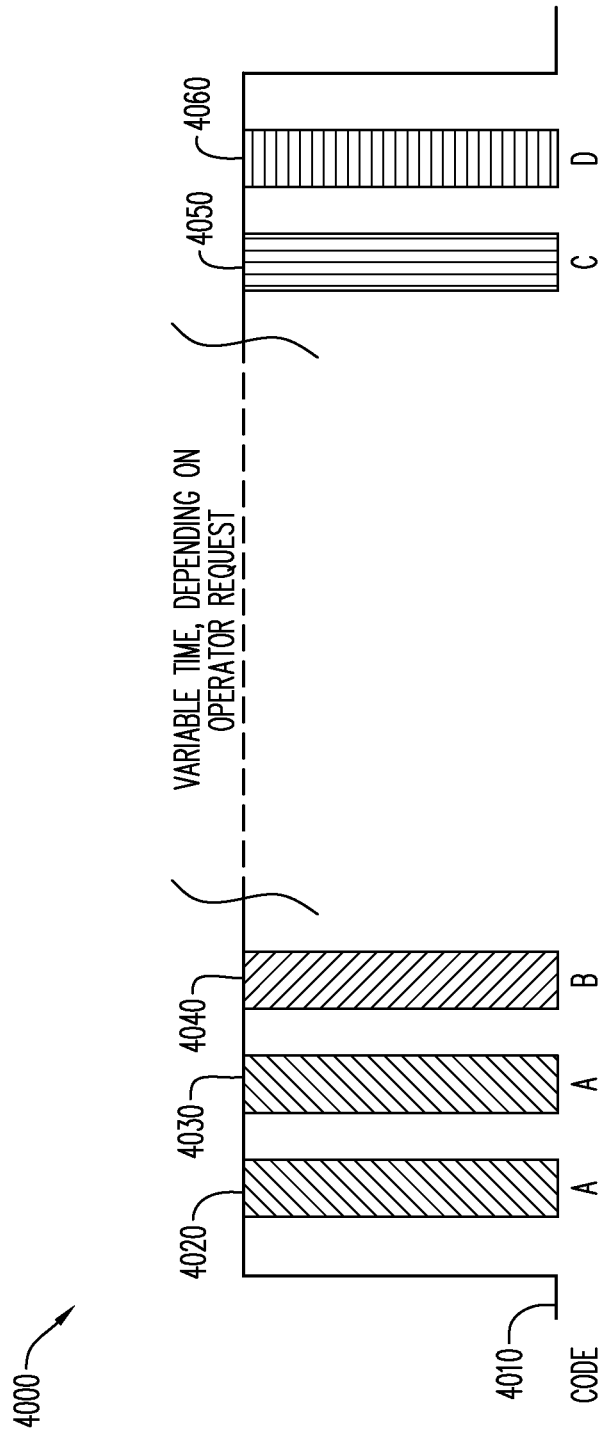
FIG. 4 is a timing diagram of an exemplary embodiment of an EIC for controlling at least one detonator, according to the present disclosure.

Referring to FIG. 4, a timing diagram of an exemplary embodiment of an EIC for controlling at least one detonator 4000, according to the present disclosure, is shown. In one embodiment, a timeline 4010 including communications between transmitting and receiving surface equipment controlled by an operator and an EIC 1000 is shown. During the timeline 4010, a first Code A 4020 and a second Code A 4030 is transmitted by the surface equipment and received by the EIC 1000, causing a third EIC in a chain of N EICs to be selected. Code B 4040 is transmitted by the surface equipment and received by the EIC 1000, causing the EIC to respond as described with regard to FIG. 2. Returning to FIG. 4, in some embodiments, a variable amount of time between transmission of Code B and Code C is dependent at least in part on operator request. At some variable point along the timeline 4010, Code C 4050 is transmitted by the surface equipment and received by the EIC 1000, causing the EIC to become armed. After Code C 4050 is received, Code D is transmitted by the surface equipment and received by the EIC 1000, causing the EIC to fire the perforation gun by igniting the fuse head to detonate the explosive substance.

Referring to FIG. 5, a diagram of the EIC for controlling at least one detonator (not shown), according to the present disclosure, is shown. The EIC 5000 includes protection circuit 100. Note that as described herein, components with identical reference numbers in different figures, such as those shown in FIG. 1 and in FIG. 5 are intended to describe the same component. Similarly, where different reference numbers are used in different figures, such as the EIC 1000 and EIC 5000 in FIG. 1 and FIG. 5, respectively, such numbering is intended to describe alternative embodiments. For example, protection circuit 100 in FIG. 1 is also illustrated here in FIG. 5 as protection circuit 100. The protection circuit 100 includes an over voltage protection at an input 102 electrically connected to an over voltage varistor at an output 104. While not shown, it is contemplated herein that at least one or more of a varistor and/or a suppressor diode may be used at an input, and at least one or more of a varistor and/or a suppressor diode may be used at an output. The EIC 5000 includes input circuit 200. The input circuit 200 includes a bridge rectifier.

The EIC 5000 includes logical circuit 300. The logical circuit 300 includes an answer back circuit 310, which includes a switch 314. The logical circuit 300 includes a supply voltage circuit 320, with a DC/DC converter 324. The logical circuit 300 also includes a microcontroller 330 with an internal or external A/D converter. The logical circuit 300 further includes a code detection circuit 340, with a signal coupling circuit 342, which couples the signal to the microcontroller 330. The logical circuit 300 still further includes a switching circuit 350, which includes at least a switch 351 to the output.

The EIC 5000 includes ignition circuit 400. The ignition circuit 400 includes a release of capacitor charging circuit 410, which includes at least an arm switch 411. The ignition circuit 400 also includes a voltage limiter for firing capacitor circuit 420, which includes a DC/DC converter with a current limitation 424. The ignition circuit 400 further includes a capacitor discharge circuit 430, which includes a firing capacitor 432, a fuse head (detonator) 434, and an ignition switch 436. The ignition circuit 400 still further includes a shot detection circuit 440, which includes two resistors 442 and 444 connected as a voltage divider to measure the capacitor voltage.

Figure 6:
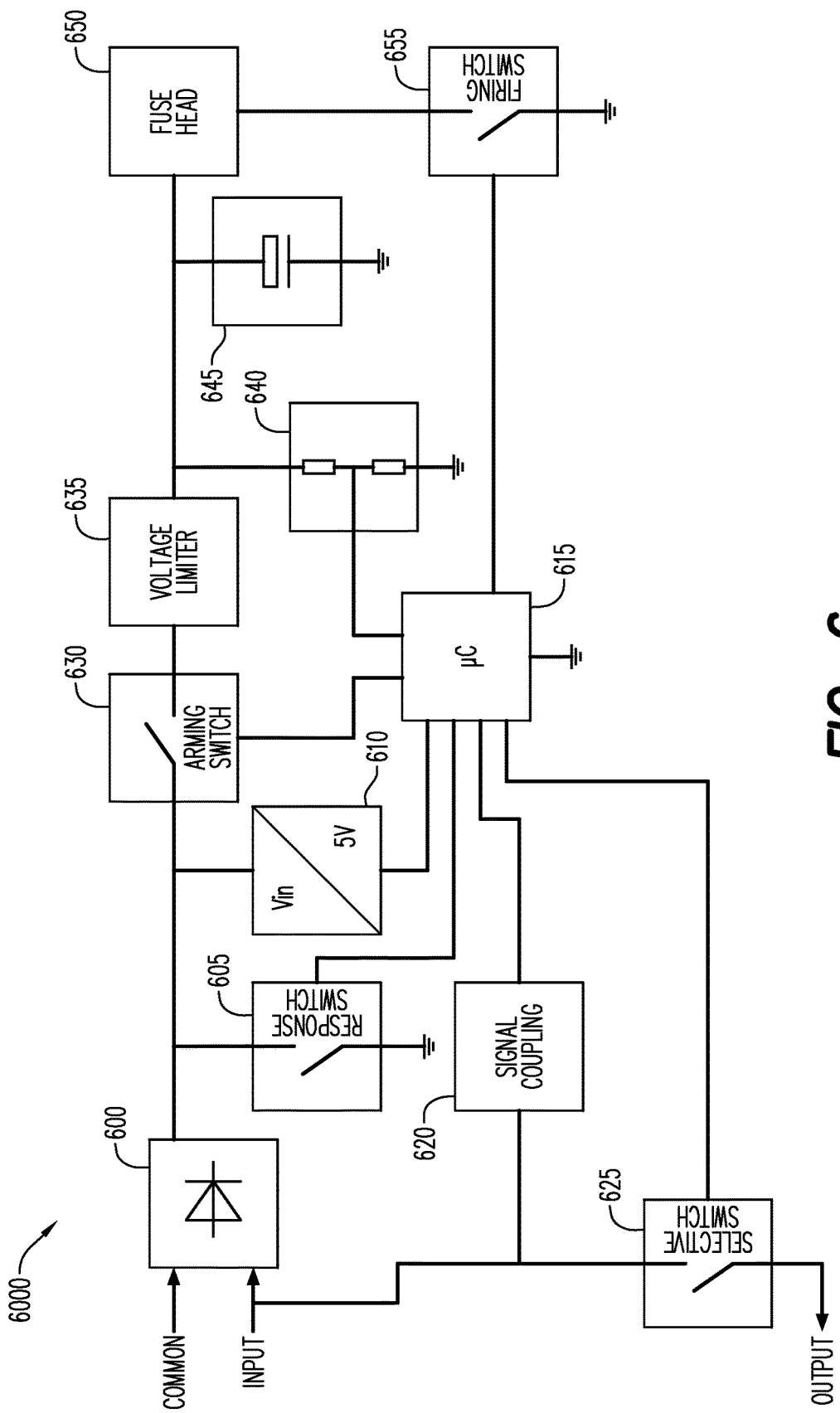
FIG. 6 is a block diagram of an EIC for controlling at least one detonator, according to the present disclosure.

Referring to FIG. 6, a block diagram of an exemplary embodiment of an EIC for controlling at least one detonator 6000, according to the present disclosure, is shown. The input circuit 600 is electrically coupled to the input line and the common line. In some embodiments, the EIC 6000 includes an answer back circuit 605, a supply voltage circuit 610, a microcontroller 615 and a code detection circuit 620 for signal coupling and a switching circuit 625. The answer back circuit 605 may indicate the result of a shot detection. In some embodiments, the EIC 6000 also includes an arming switch 630. The arming switch 630 may be active closed to charge the firing capacitor after receiving an arming code, and until it receives and reacts to a firing code. The arming switch 630 may be active again after a time delay that occurs after the discharging of the firing capacitor through the fuse head, in order to recharge the firing capacitor after ignition of the fuse head. The EIC 600 may additionally include a voltage limiter circuit 635, a firing capacitor 645, a fuse head (detonator) 650, a firing switch 655, and a shot detection circuit 640. The shot detection circuit 640 may be adapted to measure a voltage across the firing capacitor 645 before discharging through the fuse head 650, and to measure the voltage after discharging through the fuse head 650. According to an aspect, the shot detection circuit 640 measures the voltage across the firing capacitor 645 before the discharging of the firing capacitor 645, after the discharging of the firing capacitor 645, and/or after the recharging of the firing capacitor 645. According to an aspect, the shot detection circuit 640 may be active again after discharging the firing capacitor 645.

Referring to FIG. 7A, a timing diagram of an exemplary embodiment of an EIC for controlling at least one detonator 7000, according to the present disclosure, is shown. The timing diagram represents a coded bit exemplar of the eight bit code of Codes A-D. The left side represents the coded bit logic "1", while the right side represents the coded bit logic "0" exemplar of the eight bit code of Codes A-D. In the coded bit logic "1" all high and low signal periods for transmitting digital bits in a code, such as code selected from Codes A-D, are substantially equal or greater than one millisecond. In the coded bit logic "0", the high signal period (duty cycle) is a holding factor multiplied by the high signal period used in the coded bit logic "1". In some embodiments, that holding factor is greater than 1.5. As shown in FIG. 7A, the holding factor is approximately 3, meaning the high signal period is held for three times longer in a coded bit logic "0" as opposed to a coded bit logic "1". The purpose of high and low signal periods greater than one milliseconds and of holding the high signal period longer in a coded bit logic "0" is to offset the longer time needed to raise the voltage in the long wireline due to increased capacitance. The purpose of the holding factor is to reduce the low signal periods to improve the voltage supply.

Referring to FIG. 7B, is an equation diagram of an exemplary embodiment of an EIC for controlling at least one detonator as shown in FIG. 7A, according to the present disclosure, is shown. All high and low signal periods for transmitting digital bits in a code, such as code selected from Codes A-D, are substantially equal and greater than one millisecond. In coded bit logic "0", the high signal period (duty cycle) is the holding factor multiplied by the high signal period used in coded bit logic "1". In some embodiments, that holding factor is greater than 1.5.

Referring to FIG. 8A, a cross-sectional side view of an exemplary embodiment of a detonator 8000 having an EIC for controlling the detonator, according to the present disclosure, is shown. The detonator 8000 includes an input connection 8010, an output connection 8020, a common connection 8030, an EIC 8040, a fuse head 8050, a primary charge 8060 and a secondary charge 8070.

Referring to FIG. 8B, a cross-sectional side view of an exemplary embodiment of a detonator 8100 having an EIC for controlling the detonator, according to the present disclosure, is shown. The detonator 8000 includes an input line (red) 8010, an output line (blue) 8020, a common line (black) 8030, an EIC 8040, a fuse head 8050, a primary charge 8060 and a secondary charge 8070.

Some embodiments herein describe an EIC for controlling at least one detonator, including a protection circuit, including at least one of a fuse, a circuit breaker and an automatic switch In an embodiment, the EIC further includes an input circuit electrically coupled to the protection circuit. The EIC may include a logical circuit electrically coupled to the input circuit, and including an answer back circuit, and a switching circuit adapted to switch to the next detonator or igniter. According to an aspect, the EIC includes an ignition circuit electrically coupled to the logical circuit. The ignition circuit may include a capacitor charging circuit, a capacitor discharge circuit to discharge a firing capacitor through the fuse head, and a shot detection circuit adapted to measure a voltage across the firing capacitor before discharging through the fuse head and to measure a voltage after discharging through the fuse head.

Some embodiments herein describe an electronic ignition circuit for controlling at least one detonator, including a protection circuit, including a spark gap, at least one of a fuse, a circuit breaker and an automatic switch, at least one or more of a varistor and/or a suppressor diode at an input, and at least one or more of a varistor and/or a suppressor diode at an output, an input circuit electrically coupled to the protection circuit, including a bridge rectifier, a logical circuit electrically coupled to the input circuit, including an answer back circuit, and a switching circuit for switching from a first detonator to a next detonator, and an ignition circuit including a capacitor charging circuit, and a capacitor discharge circuit to discharge a firing capacitor through a fuse head.

Some embodiments herein describe a method for controlling at least one detonator with an electronic ignition circuit, including polling for a first input signal, determining if the first input signal contains a first code, closing a selective switch if the first signal contains the first code, determining if the first input signal contains a second code if the first input signal does not contain the first code, closing a response switch if the first input signal contains the second code, polling for a second input signal, determining if the second input signal contains a second code, closing arming switch and charging firing capacitor if the second input signal contains the second code, polling for a third input signal, determining if the third input signal contains a third code, closing firing switch if the third input signal contains a third code.

It will be understood that various modifications can be made to the embodiments of the present disclosure herein without departing from the spirit and scope thereof. Therefore, the above description should not be construed as limiting the disclosure, but merely as embodiments thereof. Those skilled in the art will envision other modifications within the scope and spirit of the devices and methods as defined by the claims appended hereto.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of"

Advances in science and technology may make equivalents and substitutions possible that are not now contemplated by reason of the imprecision of language; these variations should be covered by the appended claims. This written description uses examples to disclose the device and method, including the best mode, and also to enable any person of ordinary skill in the art to practice the device and method, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An electronic ignition circuit for controlling at least one detonator, comprising:
   a protection circuit comprising at least one of a fuse, a circuit breaker and an automatic switch;
   an input circuit electrically coupled to the protection circuit, the input circuit comprising a bridge rectifier;
   a logical circuit electrically coupled to the input circuit, the logical circuit comprising:
      an answer back circuit; and
      a switching circuit adapted to switch from a first detonator or igniter to a second detonator or igniter;
   an ignition circuit electrically coupled to the logical circuit, the ignition circuit comprising:
      a capacitor charging circuit;
      a capacitor discharging circuit to discharge a firing capacitor through a fuse head;
      a shot detection circuit adapted to measure a voltage across the firing capacitor before discharging through the fuse head and to measure the voltage after discharging through the fuse head; and
   an arming switch, wherein the arming switch is active closed to charge the firing capacitor after receiving an arming code and until it receives and reacts to a firing code.

2. The electronic ignition circuit for controlling at least one detonator of claim 1, wherein the shot detection circuit is active after discharging the firing capacitor.

3. The electronic ignition circuit for controlling at least one detonator of claim 1, further comprising a firing transistor to discharge the firing switch through the fuse head, wherein the firing transistor remains active closed after the discharging the firing capacitor through the fuse head.

4. The electronic ignition circuit for controlling at least one detonator of claim 1, wherein the arming switch is active again after a time delay, wherein the time delay occurs after the discharge of the firing capacitor through the fuse head, to recharge the firing capacitor after ignition of the fuse head.

5. The electronic ignition circuit for controlling at least one detonator of claim 4, wherein the shot detection circuit measures the voltage across the firing capacitor:
   before the discharging of the firing capacitor;
   after the discharging of the firing capacitor; and
   after the recharging of the firing capacitor.

6. The electronic ignition circuit for controlling at least one detonator of claim 1, wherein at least three measured voltages are used to set a result variable representing one of a successful shot, and a failed shot.

7. The electronic ignition circuit for controlling at least one detonator of claim 6, wherein a result of the shot detection is indicated by the answer back circuit.

8. The electronic ignition circuit for controlling at least one detonator of claim 1, wherein the protection circuit comprises a spark gap.

9. The electronic ignition circuit for controlling at least one detonator of claim 1, wherein the protection circuit comprises:
   at least one of one or more of a varistor and one or more of a suppressor diode, at an input; and
   a varistor and a suppressor diode, at an output.

10. The electronic ignition circuit for controlling at least one detonator of claim 1, wherein the logical circuit comprises a supply voltage circuit.

11. The electronic ignition circuit for controlling at least one detonator of claim 1, wherein the logical circuit comprises a code detection circuit.

12. The electronic ignition circuit for controlling at least one detonator of claim 1, wherein the logical circuit comprises a microcontroller programmed to detect codes from a code detection circuit.

13. The electronic ignition circuit for controlling at least one detonator of claim 1, wherein the ignition circuit comprises a voltage limiter for the firing capacitor.

14. An electronic ignition circuit for controlling at least one detonator, comprising:
   a protection circuit comprising:
      a spark gap;
      at least one of a fuse, a circuit breaker and an automatic switch;
      at least one of one or more of a varistor and one or more of a suppressor diode, at an input; and
      at least one of one or more of a varistor and one or more of a suppressor diode, at an output;
   an input circuit electrically coupled to the protection circuit, comprising a bridge rectifier;
   a logical circuit electrically coupled to the input circuit, comprising:
      an answer back circuit; and
      a switching circuit for switching from a first detonator to a next detonator; and
   an ignition circuit comprising:
      a capacitor charging circuit; and
      a capacitor discharging circuit to discharge a firing capacitor through a fuse head, wherein duration of a high signal period is multiplied by a holding factor, the holding factor being greater than 1.5.

15. The electronic ignition circuit for controlling at least one detonator of claim 14, wherein the logical circuit comprises a code detection circuit, and a microcontroller programmed to detect codes from the code detection circuit.

16. The electronic ignition circuit for controlling at least one detonator of claim 15, wherein the ignition circuit includes a shot detection circuit that allows for measurement of voltage of the firing capacitor before the detonator or fuse head and to allow for safe discharge of the firing capacitor over an amount of time.

* * * * *